3,124,570
ADDITION OF HYPOHALITES TO
UNSATURATED STEROIDS
Samuel G. Levine, Philadelphia, and Monroe E. Wall, Oreland, Pa., assignors to the United States of America as represented by the Secretary of Agriculture
No Drawing. Filed June 20, 1958, Ser. No. 743,480
3 Claims. (Cl. 260—239.55)
(Granted under Title 35, U.S. Code (1952), sec. 266)

A non-exclusive, irrevocable, royalty-free license in the invention herein described, throughout the world for all purposes of the United States Government, with power to grant sublicenses for such purposes, is hereby granted to the Government of the United States of America.

This invention relates to novel cyclopentanophenanthrene derivatives and to processes for their production. More particularly, the present invention relates to steroid halohydrin acetates, the preparation of these compounds from cyclopentanophenanthrene derivatives, and to the preparation of steroid epoxides from the steroid halohydrin acetates.

The steroid halohydrin acetates of the invention are cyclopentanophenanthrene derivatives in which a halogen and an acetoxy group are located on adjacent carbon atoms in such a manner that the halogen and the acetoxy group bear a diaxial relationship to each other. By axial we mean that the halogen and the acetate functions are attached approximately perpendicular to the plane of the five- or six-membered carbon atom ring in which they are located, and since these functions are located on adjacent carbon atoms, they will inherently be trans to each other. The halogen and the acetate group are therefore said to bear a diaxial relationship to each other.

We have discovered that acetyl hypohalites react with unsaturated cyclopentanophenanthrene derivatives of the types such as cholostenes, androstenes, pregnenes, steroidal spirostenes, sitosterol and stigmasterol derivatives, and bile acid derivatives, to introduce a halogen atom and an acetoxy group into the steroid nucleus on the adjacent carbon atoms at the site of the unsaturation.

According to the present invention an acetyl hypohalite, such as acetyl hypobromite or acetyl hypochlorite, in solution in a cold, inert, neutral solvent, for example, carbon tetrachloride, is added to a cold solution of an unsaturated cyclopentanophenanthrene derivative of the general formula

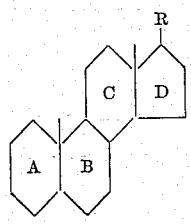

wherein the fusion of rings A and B may be cis, trans or unsaturated $\Delta^{5(6)}$ double bond; the rings A, B, C and D may be substituted with groups selected from hydroxyl, acetoxy, carbonyl and epoxy; and wherein R may be —H, =O,

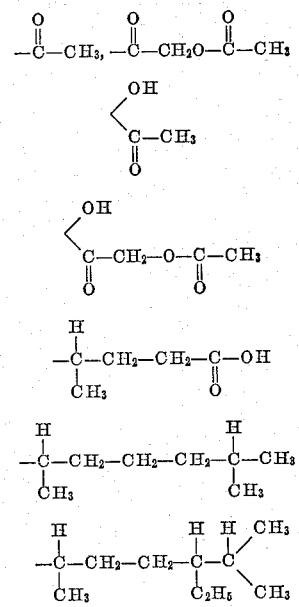

or the steroidal sapogenin sidechain, in the same neutral solvent, and allowed to react to produce the corresponding cyclopentanophenanthrene halohydrin acetate in which the halogen and the acetoxy groups are located on adjacent carbon atoms in such a manner that the halogen and acetate functions bear a diaxial relationship to each other.

The structure of a typical steroid halohydrin acetate is as follows:

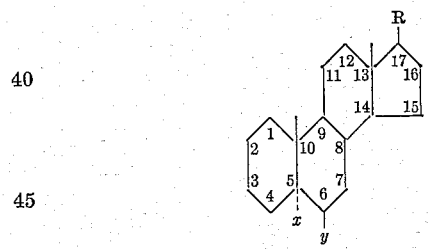

where $x$ is chlorine or bromine and $y$ is an acetoxy radical,

and R is as previously described. In this particular structure the introduced functions are $5\alpha$ $x$ and $6\beta$ $y$. Preferred embodiments of the present invention are the cyclopentanophenanthrene halohydrin acetates in which the halogen and acetate functions may be defined as follows.

$C_5$ cis series:
    $1\beta$ $x$, $2\alpha$ $y$
    $3\beta$ $x$, $2\alpha$ $y$
    $3\beta$ $x$, $4\alpha$ $y$
    $14\alpha$ $x$, $8\beta$ $y$
    $12\alpha$ $x$, $11\beta$ $y$
    $14\alpha$ $x$, $15\beta$ $y$
    $17\alpha$ $x$, $16\beta$ $y$ C₅ trans series (Δ⁵ series):

1α x, 2β y
3α x, 2β y
3α x, 4β y
5α x, 4β y
5α x, 6β y
7α x, 6β y
7α x, 8β y
9α x, 11β y
12α x, 11β y
14α x, 8β y
14α x, 15β y
17α x, 16β y

In all the above instances, $x$ represents chlorine or bromine and $y$ represents an acetoxy radical. The stereochemistry and location of halogen and acetate in the cyclopentanophenanthrene nucleus is substantially as shown above. However, our invention also includes any of the small proportion of minor isomers of opposite configuration as long as the halogen and acetate functions are diaxial. Thus, in the above lists, our invention would apply in the C₅ cis series to 1β y, 2α x and to the other corresponding isomers of this series, and to the 1β x, 2α y type of isomers of the C₅ trans series.

The cyclopentanophenanthrene halohydrin acetates are prepared from the corresponding unsaturated cyclopentanophenanthrene derivatives. Thus, a 5 x 6 y halohydrin acetate as shown above is prepared from the corresponding Δ⁵⁽⁶⁾-cyclopentanophenanthrene derivative. Our invention is not limited to the production of mono-halohydrin acetates. If two reactive double bonds are present a di-halohydrin acetate is formed. Most commonly if two double bonds are present in the steroid nucleus one will be located at the Δ⁵⁽⁶⁾ position. Accordingly, the starting materials for the preparation of di-halohydrin acetates are Δ¹⁽²⁾, Δ⁵⁽⁶⁾; Δ²⁽³⁾, Δ⁵⁽⁶⁾; Δ⁵⁽⁶⁾, Δ⁹⁽¹¹⁾; Δ⁵⁽⁶⁾, Δ¹¹⁽¹²⁾; and Δ⁵⁽⁶⁾, Δ¹⁶⁽¹⁷⁾ cyclopentanophenanthrene derivatives. Our invention, furthermore, is not restricted to di-halohydrin acetates which contain a 5 x 6 y moiety, but broadly includes any di-halohydrin acetate steroid which can be prepared from precursors having two non-adjacent double bonds. The acetyl hypohalites do not react readily with double bonds conjugated to a ketone in a 6 membered ring, particularly with the 3-keto-Δ⁴ moiety. Steroids containing this group and an isolated double bond, form only the mono-halohydrin acetate at the site of the non-conjugated double bond.

The steroid mono-halohydrin acetates of the invention are prepared by reacting one mole of mono-unsaturated steroid with one mole of acetyl hypohalite which may be either acetyl hypobromite or acetyl hypochlorite. If one wishes to prepare a di-halohydrin acetate one reacts one mole of di-unsaturated steroid with two moles of the acetyl hypohalite. In either event, the reaction is carried out at a temperature in the range of about −20 to +30° C. in the presence of an inert, neutral solvent such as methylene chloride, chloroform, and carbon tetrachloride, the latter being preferred.

The acetyl hypohalite reagents employed in the addition reactions were freshly prepared and analyzed prior to use. Acetyl hypobromite and acetyl hypochlorite are formed by the reaction between the acetate of a heavy metal, such as silver or mercury, and a solution of bromine and chlorine, respectively, in a neutral, inert solvent such as methylene chloride, chloroform, carbon tetrachloride, hexane or heptane. The by-product of the reaction is the halide of the heavy metal, for example, silver chloride. The steroid and the acetyl hypohalite may be reacted "in situ" in the presence of the halide of the heavy metal, or the halide may be removed from the reagent prior to the adding the reagent to the unsaturated steroid. In either instance the unsaturated steroid, in solution in an inert, neutral solvent, preferably carbon tetrachloride, is cooled to a temperature in the range of −20° to +30° C., preferably about 0° C., and a slight molar excess of the acetyl hypohalite in the same solvent is added with stirring and cooling. The course of the reaction is followed iodiametrically. In general the addition is rapid and is usually complete within one hour. The steroid halohydrin acetates are then recovered, purified and characterized. The addition reaction proceeds when less than a molar ratio of acetyl hypohalite is used, resulting in a mixture of the original steroid and the steroid halohydrin acetate. In practice, a slight molar excess of the acetyl hypohalite reagent is used, thereby insuring high yields of the steroidal halohydrin acetate.

Steroidal halohydrin acetates are useful intermediates for the preparation of compounds with anti-inflammatory, progestational, estrogenic or androgenic activity. The halohydrin acetate moiety is stable toward acidic reagents, halogens, neutral salts and certain oxidizing systems. Thus, a double bond can be protected by means of forming the corresponding halohydrin acetate, reactions carried out on another part of the molecule, and the double bond regenerated in excellent yield by treatment with Raney nickel or zinc dust. Reaction of the halohydrin acetate with alkali gives epoxides, as shown in Examples 14–17 below, which are in themselves useful intermediates.

The preparation of the acetyl hypohalite may be carried out as follows:

*Preparation of acetyl hypobromite reagent (0.1 M in carbon tetrachloride).*—4.0 g. of silver acetate was suspended in 160 ml. of carbon tetrachloride and stirred at 0° C. under anhydrous conditions. A solution of 1.00 ml. of liquid bromine in 20 ml. of carbon tetrachloride was then added over 30 minutes with stirring and cooling. Stirring and cooling were continued for 90 minutes; by that time the red bromine color was no longer visible and the solution appeared light yellow-orange. Stirring was then stopped to allow the yellow precipitate (silver bromide) to settle. Portions of the clear supernatant liquid were withdrawn for iodometric titration and for use in the various addition reactions.

*Preparation of acetyl hypochlorite reagent (0.1 M in carbon tetrachloride).*—The above procedure was repeated, substituting 20 ml. of 1.0 M chlorine in carbon tetrachloride for the bromine solution.

The foregoing acetyl hypobromite and hypochlorite reagents were used in the following examples which are illustrative of the invention. In these examples the melting points of the products are degrees centigrade, the rotations were obtained as solutions in chloroform, and the infrared data are expressed as reciprocal centimeters (cm.⁻¹).

Example 1

*Preparation of 17α-bromo-3β,16β-diacetoxy-5-pregnan-20-one.*—0.74 g. of 3β-acetoxy-5α-pregn-16-en-20-one was dissolved in 10.0 ml. of carbon tetrachloride and cooled to 0° C. Twenty-five ml. of cold 0.095 M acetyl hypobromite reagent was added in one portion with stirring and cooling. The reaction solution was then washed with cold, dilute sodium bisulfite solution, followed by water. After drying over sodium sulfate and removal of solvent, the product (0.725 g.) was obtained as prisms from methanol, M.P. 200–206, [α]$_D$ +68.6°. Characteristic infrared absorption bands were found at 1757 and 1232 (16-acetate), 1742 and 1250 (3-acetate), 1722 (20-ketone), 761 (halogen). *Analysis.*—Calcd. for C₂₅H₃₇O₅Br: C, 60.4; H, 7.5. Found: C, 60.15; H, 7.66.

Example 2

*Preparation of 17α-chloro-3β,16β-diacetoxy-5α-pregnan-20-one.*—0.36 g. of 3β-acetoxy-5α-pregn-16-en-20-one in 2.0 ml. of methylene chloride was treated with 140 ml. of 0.075 M acetyl hypochlorite reagent under the above reaction conditions. The reaction mixture was stirred at 0° C. for five minutes and then worked up as in Example 1. The product (0.130 g.) was obtained as blades from methanol, M.P. 213–221, [α]$_D$ +61.3°. Characteristic infra-red absorption bands were found at 1760 and 1230 (16-acetate), 1742 and 1250 (3-acetate), 1730 (20-ketone), 790 (halogen).

Example 3

*Preparation of 9α-bromo-3β,11β-diacetoxy-5α,22β,25D-spirostane.*—A solution of 600 mg. of 3β-acetoxy-5α,22β,25D-spirost-9(11)-en in 25 ml. of carbon tetrachloride was cooled to 0° C. and treated with 20 ml. of cold 0.1 M acetyl hypobromite reagent. After ten minutes at 0°, the solution was worked up as in Example 1 to yield 0.43 g. of plates (from methanol), M.P. 168–175°, [α]$_D$ —19.8°. Characteristic infra-red absorption bands were found at 1737 (broad, 3- and 11-acetate), 1230–1250 (3- and 11-acetate), 760 and 730 (halogen).

Example 4

*Preparation of 12α-bromo-3β,11β - diacetoxy - 5α,22β, 25D-spirostane.*—A solution of 0.456 g. of 3β-acetoxy-5α,22β,25D-spirost-11-en in 10 ml. of carbon tetrachloride at 0° C. was treated with 10.0 ml. of 0.11 M acetyl hypobromite reagent. After 90 minutes the solution was worked up as in Example 1. The product was not obtained crystalline, but was purified by filtration through a short column of activated magnesium silicate. Characteristic, infra-red absorption bands were found at 1735 (broad, 3- and 11-acetate), 1245 (3-acetate), 1230 (11-acetate), 762 and 735 (halogen).

Example 5

*Preparation of 5α-bromo - 3β,6β - diacetoxy - cholestane.*—1.72 g. of 3β-acetoxy-cholest-5-en was dissolved in 20 ml. of carbon tetrachloride and cooled to 0° C.; 42.0 ml. of 0.10 M acetyl hypobromite reagent was then added with stirring. After five minutes at 0° C. the reaction mixture was worked up as in Example 1. Crystallization of the final residue from methanol yielded 1.30 g. of product, M.P. 80–82°, [α]$_D$ —58.0. Characteristic infra-red absorption bands were found at 1740 (broad, 3- and 6-acetate), 1240 (3-acetate), 1225 (6-acetate), 750 (halogen).

Example 6

*Preparation of 17α - bromo-3β,16β-diacetoxy-5β-pregnan-20-one.*—Following the procedure described in Example 1, 1.0 g. of 3β-acetoxy-5β-pregn-16-4-en-20-one, on treatment with acetyl hyprobromite reagent, gave 0.8 g. of 17α-bromo-3β,16β-diacetoxy-5β-pregnan-20-one.

Example 7

*Preparation of 17α - chloro-3β,16β-diacetoxy-5β-pregnan-20-one.*—In a manner similar to that described in Example 2, treatment of 3β-acetoxy-5β-pregn-16-en-20-one with acetyl hypochlorite gave 17α-chloro-3β,16β-diacetoxy-5β-pregnan-20-one.

Example 8

*Preparation of 5α,17α - dibromo-3β,6β,16β-triacetoxy-pregnan-20-one.*—Using the reaction conditions and product recovery procedures of Example 1, 3β-acetoxy-5,16-pregnadien-20-one was treated with excess acetyl hypobromite to give 5α,17α-dibromo-3β,6β,16β-triacetoxy-pregnan-20-one.

Example 9

*Preparation of 5α,17α - dichloro-3β,6β,16β-triacetoxy-pregnan-20-one.*—In a manner similar to that described in Example 2, treatment of 3β-acetoxy-5,16-pregnadien-20-one with acetyl hypochlorite gave 5α,17α-dichloro-3β,6β,16β-triacetoxy-pregnan-20-one.

Example 10

*Preparation of 9α-bromo-11β-acetoxy-17β-hydroxy-17-methyl-4-androsten-3-one.*—In the manner described in Example 1, treatment of 17β-hydroxy-17-methyl-4,9(11)-androstadien-3-one with acetyl hypobromite gave 9α-bromo - 11β - acetoxy - 17β - hydroxy - 17 - methyl - 4-androsten-3-one.

Example 11

*Preparation of 9α-bromo-11β,21-diacetoxy-4-pregnen-3-one.*—Following the procedures described in Example 1, treatment of 21-acetoxy-17α-hydroxy-4,9(11)-pregnadien-3,20-dione with acetyl hypobromite gave 9α-bromo-11β,21-diacetoxy-4-pregnen-3-one.

Example 12

*Preparation of 5α-bromo-3β,4β-diacetoxy-pregnan-20-one.*—In a manner similar to that described in Example 1, treatment of 3β-acetoxy-4-pregnene-20-one with acetyl hypobromite gave 5α-bromo-3β,4β-diacetoxy-pregnan-20-one.

Example 13

*Preparation of 7α - bromo - 3β,8β - diacetoxy-cholestane.*—In a manner similar to that described in Example 1, reacting acetyl hypobromite with 3β-acetoxy-cholest-7-ene gave 7α-bromo-3β,8β-diacetoxy-cholestane.

We have discovered also that the trans, diaxial steroidal halohydrin acetates described above can be converted to epoxides in high yields upon treatment with a base, in particular with the common alkali bicarbonates, carbonates, or hydroxides, in the presence of a water miscible organic solvent.

Steroid epoxides are useful intermediates for the production of cortisone and its analogues. Thus, 9α,11β-epoxy-tigogenin acetate on treatment with hydrogen bromide gives 9α-bromo-11β-hydroxy-tigogenin acetate which can be converted to 11 keto-tigogenin acetate, a known cortisone precursor. Alternatively, the epoxides can be treated with hydrogen fluoride to give fluoro-hydroxy compounds of high physiological activity.

This method of preparing steroidal epoxides has distinct advantages over previously described methods in that the yields are excellent and no side reactions occur.

According to the present invention, a cyclopentanophenanthrene halohydrin acetate is heated in an aqueous, alkaline, water-miscible organic solvent to remove the halogen and acetoxy group on adjacent carbon atoms and to form an epoxy linkage at this site. That is, the steroidal halohydrin acetate is converted to the corresponding steroidal epoxide. On completion of the reaction, the solvent is diluted with water and the steroidal epoxide isolated by filtration or solvent extraction. The product is purified and characterized by the determination of physical constants of the epoxide or its acetate derivative.

The water soluble alcohols such as methanol, ethanol or isopropanol, containing about 5 to 20% water are excellent solvents for the reaction to form the epoxides. Other water miscible solvents such as dioxane and tetrahydrofuran may also be used. The temperature at which the reaction is run affects only the rate of epoxide formation, and temperatures ranging from 20 to 100° C. may conveniently be used. Likewise, the pH of the solution is not critical. Although the sodium or potassium compounds, such as carbonates, bicarbonates and hydroxides are practical reagents, either weaker or stronger alkaline agents may be employed. The reaction time is a function of the temperature and the alkali used and may vary from 15 minutes to 24 hours.

The following examples, 14 to 17, illustrate the preparation of the epoxy compounds of the invention:

Example 14

*Preparation of 16β,17β - epoxy-3β-acetoxy-5α-17-isopregnan-20-one.*—0.15 g. of 17α-bromo-3β,16β-diacetoxy-5α-pregnan-20-one (prepared as in Example 1) was heated under reflux for one hour with 10 ml. methanol, 2 ml. water, and 0.25 g. potassium carbonate. The solution was then concentrated at reduced pressure, diluted with water, and the product extracted with ether. The residue from the dried, concentrated ether extracted was acetylated with acetic anhydride-pyridine. The acetate was recrystallized from methanol to yield blades, M.P. 157–9 $[\alpha]_D$ −64.2. Characteristic infra-red absorption bands were found at 1730 (acetate) and 1705 (ketone). *Analysis.*—Calcd. for $C_{23}H_{34}O_4$: C, 73.76; H, 9.15. Found: C, 74.04; H, 9.64.

*Example 15*

Preparation of *9β,11β-epoxy-3β-hydroxy-5α,22β,25D-spirostane.*—61 mg. of 9α-bromo-3β,11β-diacetoxy-5α,22β,25D-spirostane (prepared as in Example 3) was dissolved in 4.0 ml. of ethanolic potassium hydroxide (2½%) and boiled under reflux for 90 minutes. The reaction mixture was then cooled and distributed between acidified ($H_2SO_4$) water and ether. The ether layer was washed with water, dried, concentrated at reduced pressure, and the residue crystallized from hexane to yield 40 mg. of the 9,11-oxide, M.P. 209–211, $[\alpha]_D$ −12.6. Characteristic infra-red absorption bands were found at 3610 (hydroxyl), 890 and 920 (spiroketal). *Analysis.*—Calcd. for $C_{27}H_{42}O_4$: C, 75.31; H, 9.83. Found: C, 75.09; H, 9.88.

*Example 16*

Preparation of *11β,12β-epoxy-3β-acetoxy-5α,22β,25D-spirostane.*—0.16 g. of 12α-bromo-3β,11β-diacetoxy-5α,22β,25D-spirostane (prepared as in Example 4) was saponified by the procedure described in Example 15. The total product was then acetylated with acetic anhydride-pyridine at room temperature. The acetate was obtained as plates from methanol, M.P. 199–206°. The melting point was not depressed by admixture with an authentic sample of 11β,12β-epoxy-3β-acetoxy-5α,22β,25D-spirostane and the infra-red spectrum was identical with that of the authentic epoxide.

*Example 17*

Preparation of *5β,6β-epoxy-3β-acetoxy cholestane.*—The compound of Example 5, 5α-bromo-3β,6β-diacetoxy cholestane, 830 mg., was heated under reflux for one hour in 20 ml. of methanol containing 1.0 g. of potassium hydroxide. The resulting solution was concentrated at reduced pressure, diluted with water, and extracted with ether. The washed and dried ether solution was concentrated to recover a crystalline residue of the epoxy alcohol. These solids were treated directly with acetic anhydride-pyridine solution at room temperature to obtain the acetate derivative. The acetate was recovered and recrystallized to yield 430 mg. product, M.P. 91–95°, $[\alpha]_D$ −0.36°. Literature reference, HCA 27, 513 (44), gives rotation values of −1 for the β epoxide and +44 for the α epoxide.

We claim:

1. A process for the preparation of a steroid halohydrin acetate comprising reacting 3β-acetoxy-5α,22β,25D-spirost-9(11)-en, in solution in an inert, neutral organic solvent at a temperature of about from −20 to +30° C., with an acetylhypohalite selected from the group consisting of acetylhypobromite and acetylhypochlorite, and recovering a 9α-halo-3β,11β-diacetoxy-5α,22β,25D-spirostane.

2. The process of claim 1 in which the acetylhypohalite is acetylhypobromite and the steroid halohydrin acetate product is 9α-bromo-3β,11β-diacetoxy-5α,22β,25D-spirostane.

3. A process for the preparation of 9β,11β-epoxy-3β-hydroxy-5α,22β,25D-spirostane comprising reacting 3β-acetoxy-5α,22β,25D-spirost-9(11)-en, in solution in an inert, neutral organic solvent at a temperature of about from −20 to +30° C., with a reagent selected from the group consisting of acetyl hypobromite and acetyl hypochlorite, separating a 9α-halo-3β,11β-diacetoxy-5α,22β,25D-spirostane from the reaction mixture, heating the 9α-halo-3β,11β-diacetoxy-5α,22β,25D-spirostane in an aqueous, alkaline water-miscible, base-stable, organic solvent and recovering 9β,11β-epoxy-3β-hydroxy-5α,22β,25D-spirostane.

References Cited in the file of this patent

UNITED STATES PATENTS

| | | |
|---|---|---|
| 2,752,365 | Marlatt et al. | June 26, 1956 |
| 2,763,671 | Fried et al. | Sept. 18, 1956 |
| 2,789,989 | Julian et al. | Apr. 23, 1957 |
| 2,800,489 | Reichstein | July 23, 1957 |
| 2,816,121 | Gould et al. | Dec. 10, 1957 |
| 2,840,581 | Hogg et al. | June 24, 1958 |

OTHER REFERENCES

Callow et al.: J. Chem. Soc. (1956), pp. 4739 to 2742 relied on.

Fried et al.: J. Amer. Chem. Soc., vol. 75 (1953), page 2273 relied on.